United States Patent [19]
Metcalf

[11] Patent Number: 5,669,649
[45] Date of Patent: Sep. 23, 1997

[54] DITCH SHOVEL

[76] Inventor: Tom Metcalf, P.O. Box 8594, Incline Village, Nev. 89452

[21] Appl. No.: 647,576

[22] Filed: May 13, 1996

[51] Int. Cl.$^6$ .................... A01B 1/02; B25G 1/00
[52] U.S. Cl. ............................ 294/57; 294/49
[58] Field of Search .................. 294/49, 50.6, 51, 294/57; 16/110 R, 116 R; 76/113; 111/92, 106, 115; 172/13, 371, 381

[56] References Cited

U.S. PATENT DOCUMENTS

| | | | |
|---|---|---|---|
| 701,805 | 6/1902 | Ellison | 294/51 |
| 865,566 | 9/1907 | Carpenter et al. | |
| 873,209 | 12/1907 | Busch | |
| 883,702 | 4/1908 | Ellison | 294/49 |
| 1,136,754 | 4/1915 | Arnow | |
| 1,464,353 | 8/1923 | Crinella | 294/51 |
| 3,712,659 | 1/1973 | Kneissl | 294/57 |
| 3,767,249 | 10/1973 | Rogers | |
| 4,247,141 | 1/1981 | Grint | 294/49 |
| 4,396,214 | 8/1983 | Lesche | |
| 4,489,795 | 12/1984 | Leidy | 294/49 X |
| 5,109,930 | 5/1992 | Napier | 294/49 X |
| 5,209,534 | 5/1993 | Crenshaw et al. | 294/49 X |
| 5,211,669 | 5/1993 | Bonnes et al. | 294/57 X |

FOREIGN PATENT DOCUMENTS

| | | | |
|---|---|---|---|
| 1984 | of 1878 | United Kingdom | 294/49 |
| 214157 | 4/1924 | United Kingdom | 294/49 |
| 330961 | 6/1930 | United Kingdom | 294/49 |

*Primary Examiner*—Johnny D. Cherry
*Attorney, Agent, or Firm*—Ian F. Burns

[57] ABSTRACT

A ditch shovel is disclosed with a total weight between 9 and 15 pounds. The weight of the shovel allows the user to develop significant downward momentum to penetrate more deeply into the ground and dislodge more compacted earth.

2 Claims, 1 Drawing Sheet

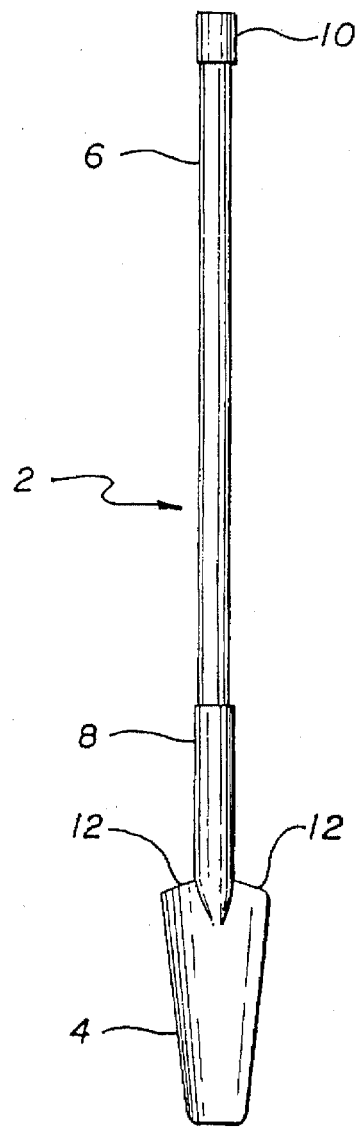
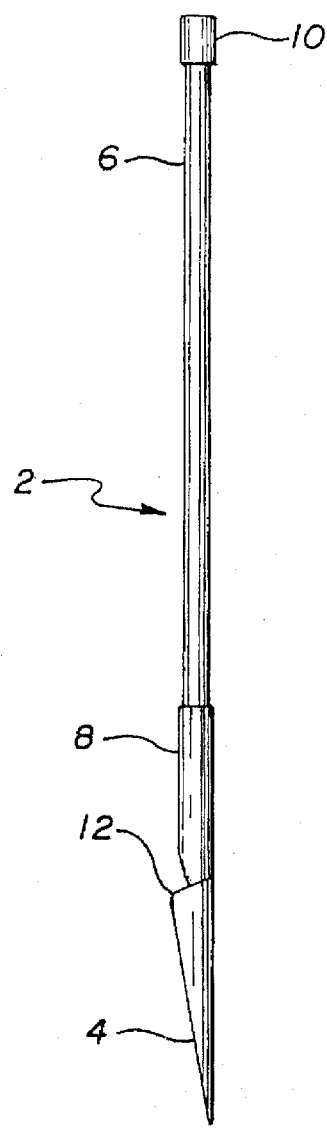
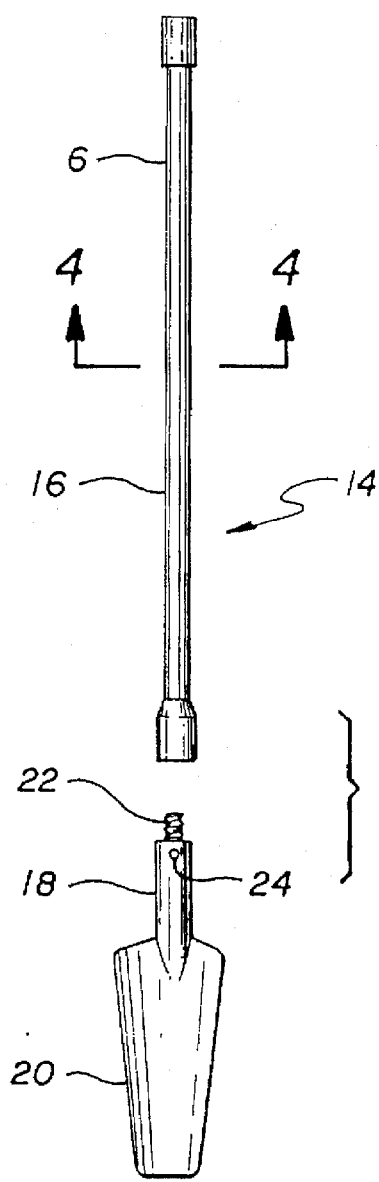
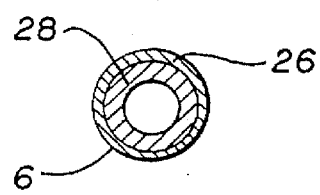

DITCH SHOVEL

BACKGROUND OF THE INVENTION

1. Field of Invention

This invention relates to an improved digging instrument and more particularly to a shovel which has a heavy handle and is adapted to trenching, ditching, and potholing.

2. Description of the Related Art

Digging instruments and shovels have been used through much of human history and many different types and styles have been designed. Examples of different kinds of shovels can be found in U.S. Pat. No. 3,767,249 to Rogers, U.S. Pat. No. 4,396,214 to Lesche, and U.S. Pat. No. 4,489,795 to Leidy. However, none of the prior art devices utilize mass and the force of gravity to produce momentum. Most digging instruments are used to lift and toss material and, therefore, they are designed to be as light as possible. If the user must lift the digging instrument along with the material that is being displaced, it is advantageous to make the instrument lighter so that the user does less work.

Mass or weight, however, can be useful for some applications. In trenching, ditch digging, and potholing, the user must thrust a shovel into the ground in order to loosen or knock down compacted soil and earth. If a shovel is heavy, the shovel can develop substantial downward momentum as the mass of the shovel is accelerated by the user's thrusting force and the force of gravity. With greater momentum, the shovel can penetrate deeper into the ground and more soil can be dislodged in a single thrust. Light shovels develop less downward momentum and they are quickly decelerated when they impact the ground. Therefore, light shovels do not penetrate as deeply and they do not dislodge as much soil.

SUMMARY OF THE INVENTION

BRIEF DESCRIPTION OF THE INVENTION

The present invention comprises a blade and a handle. The blade may take many different shapes, however, the blade of the preferred embodiment is between 4 to 7 inches wide and 12 to 17 inches long. The blade is substantially straight along its longitudinal axis, but it may be curved along its lateral axis. The blade may be provided with a neck for attaching the blade to the handle.

The handle of the present invention is preferably made of schedule 80 steel bore pipe. Bore pipe is inexpensive, strong, durable, readily available, and sufficiently massive. However, other heavy gauge pipe may also be used.

When attached to the blade, the total length of the shovel is between 77 and 89 inches. The handle could be attached to the blade by inserting the handle into the neck of the blade. In the preferred embodiment, the handle is inserted between 4 and 8 inches into the neck. Alternatively, the blade may have no neck and the handle may be attached directly to the blade body. The handle may be attached to the blade, with or without a neck, with pins, rivets, bolts, and/or welds.

The handle may also be comprised of two portions; an upper and lower portion. The lower portion may be attached to the blade with the means discussed above and the two portions of the handle may be joined together with a threaded stud. This allows the handle to be separated from the shovel for convenient storage and to allow old blades to be easily removed and new blades to be easily installed. Unlike prior art devices which teach light weight digging instruments, the present invention is designed to be heavy. The weight of the handle allows the user to produce greater downward momentum over prior art devices. The shovel will penetrate deeper into the ground and dislodge a greater amount of earth than lighter digging instruments. The deeper penetration also allows the user to probe for buried objects, such as utility lines, conduits, and culverts.

THE OBJECT OF THE INVENTION

It is an object of the present invention to provide an improved digging instrument.

It is a further object of the present invention to provide a digging instrument which allows the user to generate greater downward momentum.

It is a further object of the present invention to provide a digging instrument which penetrates deeper into earth and soil and dislodges a greater amount thereof.

It is a further object of the present invention to provide a digging instrument which is inexpensive to produce.

It is a further object of the present invention to provide a digging instrument which is durable.

It is a further object of the present invention to provide a digging instrument which allows the user to probe for buried objects.

These and other objects and advantages of the present invention may be realized by reference to the remaining portion of the specification and drawings.

BRIEF DESCRIPTION OF THE DRAWINGS

FIG. 1 is a front view of the ditch shovel of the present invention.

FIG. 2 is a side view of the ditch shovel of the present invention.

FIG. 3 is a front view on an alternative embodiment of the ditch shovel.

FIG. 4 is a cross section of the handle of the present invention taken along line IV of FIG. 3.

| REFERENCE NUMBERS | |
| --- | --- |
| 2 | shovel |
| 4 | blade |
| 6 | handle |
| 8 | neck |
| 10 | end |
| 12 | foot rest |
| 14 | shovel |
| 16 | upper portion |
| 18 | lower portion |
| 20 | blade |
| 22 | stud |
| 24 | set screw |

DESCRIPTION OF THE PREFERRED EMBODIMENT

As seen in FIGS. 1 and 2, a shovel 2 of the present invention comprises a blade 4, and handle 6. Blade 4 is preferably 12 to 17 inches long, 4 to 7 inches wide, substantially straight in its longitudinal axis, and slightly curved in its lateral axis. Neck 8 is an integrally formed part of blade 4 and is adapted to receive handle 6. Blade 4 and neck 8 may be formed of sheet steel in a manner that is well known in the art. An alternative embodiment, not shown, provides for a blade which does not have a neck.

Handle 6 is preferably made of schedule 80 steel bore pipe or other heavy gauge pipe. Bore pipe provides sufficient strength, rigidity, and mass to achieve the objectives of the invention. In addition, bore pipe is easy to adapt to use in the present invention and is readily available. Handle 6 may comprise a flared end 10 which helps prevent a user's hands from slipping off handle 6. Handle 6 preferably extends into neck 8; the amount of overlap between handle 6 and neck 8 is between 4 and 8 inches. Handle 6 may be attached to neck 8 with pins, rivets, bolts, and/or welds. An alternative embodiment does not provide neck 8 on blade 4, in which case handle 6 is attached directly to the main body of blade 4.

As seen in FIG. 3, an alternative embodiment may be provided where a shovel 14 comprises a handle with an upper portion 16 and a lower portion 18. Lower portion 18 is attached to a blade 20 in any of the attachment means discussed above. Lower portion 18 and upper portion 16 are preferably attached together with a threaded stud 22. Threaded stud 22 may be held in one portion of the handle with a set screw 24. This embodiment allows a user to easily remove and replace blade 20 when blade 20 is worn or needs maintenance.

In the preferred embodiment, blade 4 weighs between 2 and 4 pounds and handle 6 weighs between 7 and 11 pounds. The preferred total weight of shovel 2 is between 9 and 15 pounds. The total length of shovel 2 is between 77 and 89 inches. It is recognized that other material may be substituted for handle 6. A thinner gage pipe may be used if provision is made to maintain weight.

Handle 6 may be coated or covered with an insulating material such as rubber, plastic, or fiberglass. The insulating material may be used to help insulate the user from electricity should blade 4 penetrate into a buried electrical line. The insulating material may also provide a more comfortable grip for the user. As seen in FIG. 4, handle 6 comprises a heavy gauge pipe 28 which may be covered by an insulating material 26.

The overall outer diameter of handle 6 is preferably between ¾ inch and 1 inch in the body of the handle. It has been found that this range of diameters provides the most comfortable grip for the user. When the bore grip has ¾ inch diameter, insulating material may be added to the handle to produce an overall 1 inch diameter in the body of the handle.

In normal operation, a user would grasp handle 6 with both hands and raise shovel 2 a comfortable height above the ground, generally a foot to 3 feet. The user would then thrust shovel 2 downward so that blade 4 penetrates the ground immediately in front of the user. The mass of shovel 2 allows shovel 2 to achieve greater momentum. Once blade 4 has penetrated the ground, the user may then push and pull handle 6 horizontally in a back and forth motion to dislodge compacted soil and earth. The user may also step on foot rests 12 to drive blade 4 further into the ground. A second lifting and tossing shovel may be used to remove the loosened soil or shovel 2 may also be used.

In actual use, the present invention has been shown to out perform all other known digging instruments. Although there are many other digging instruments available, none match the efficiency of shovel 2 in dislodging compacted earth. A user with the present invention can dig more earth and compacted material with less effort than with any other known shovel.

Another unique advantage of the present invention is that the user may probe for buried objects. The deep penetration of the blade into the ground allows the user to sense objects, such as utility lines, conduits, and culverts. By moving the shovel back and forth, the user can detect resistance and vibration which could indicate the presence of a buried object. Digging instruments which do not penetrate as deeply into the ground cannot detect such objects.

SUMMARY

The shovel described above has the principal advantage of being heavy. The mass of the handle allows the shovel to penetrate deeper into the ground and to more efficiently dislodge compacted earth. However, the shovel is also durable, inexpensive to manufacture, and allows the user to probe for buried objects.

It will be apparent that various modifications can be made to the ditch shovel described above and shown in the drawings within the scope of the present invention. The dimensions, configuration, and arrangement of components can be different to meet specific requirements. Therefore, the scope of the present invention is to be limited only by the following claims:

What is claimed is:

1. A handle for a shovel, the shovel being adapted to dig trenches and holes, comprising:

(A) a heavy gauge pipe weighing substantially between 7 and 11 pounds and being of a length wherein the total length of the shovel is substantially between 77 and 89 inches for a user to hold the shovel and for providing mass, whereby said pipe is strong enough to withstand large stresses and is massive enough to develop a large downward momentum when thrust downward, (B) a flared end on said pipe for preventing a users hands from slipping off of said pipe, (C) insulating material covering at least part of said pipe for insulating said pipe, and (D) attachment means for attaching said pipe to a shovel blade, whereby the shovel may be comfortably used to dig deep trenches and holes by a user who stands on the surface of the ground.

2. A shovel for probing for buried objects in a trench or hole, the trench or hole having a bottom below the surface of the ground, the shovel comprising:

(A) a heavy gauge pipe handle weighing substantially between 7 and 11 pounds for a user to hold the shovel and for providing mass, whereby said handle is strong enough to withstand large stresses and is massive enough to develop a large downward momentum when thrust downward, (B) a narrow shovel blade attached to said handle for penetrating earth, whereby said blade deeply penetrates earth when thrust into the ground, (C) the total length of the shovel being substantially between 77 and 89 inches, whereby a user may thrust the shovel into the bottom of a trench or hole while standing on the surface of the ground, the shovel being long enough for the user to manipulate the shovel when the shovel is imbedded in the bottom of the trench or hole, (D) insulating material covering at least part of said handle for insulating said handle and providing a more comfortable grip, and (E) a flared end on said handle for preventing a users hand from slipping off of said handle.

\* \* \* \* \*